United States Patent
Yadav

(10) Patent No.: US 9,802,512 B1
(45) Date of Patent: Oct. 31, 2017

(54) TORSION SPRING BUSHING

(71) Applicant: Ford Global Technologies, LLC, Dearborn, MI (US)

(72) Inventor: Shailendra Yadav, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 15/096,857

(22) Filed: Apr. 12, 2016

(51) Int. Cl.
*A47C 1/00* (2006.01)
*B60N 2/16* (2006.01)
*F16C 17/12* (2006.01)
*B60N 2/44* (2006.01)

(52) U.S. Cl.
CPC ............ *B60N 2/1635* (2013.01); *B60N 2/44* (2013.01); *F16C 17/12* (2013.01)

(58) Field of Classification Search
CPC ......... B60N 2/1635; B60N 2/44; F16C 17/12; A61G 5/1067
USPC .............................. 297/344.12, 354.1, 354.11
See application file for complete search history.

(56) References Cited

U.S. PATENT DOCUMENTS

| | | |
|---|---|---|
| 616,178 A | 12/1898 | Barron |
| 771,773 A | 10/1904 | Feely |
| 1,125,155 A | 1/1915 | Nunn |
| 2,272,505 A | 2/1942 | Biggs |
| 2,661,050 A | 12/1953 | Felter |
| 2,725,921 A | 12/1955 | Markin |
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |

(Continued)

FOREIGN PATENT DOCUMENTS

| | | |
|---|---|---|
| CN | 201650491 U | 11/2010 |
| CN | 203097995 U | 7/2013 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Jose V Chen
(74) *Attorney, Agent, or Firm* — Vichit Chea; Price Heneveld LLP

(57) ABSTRACT

A vehicle seating assembly is provided which includes a seat back and a seat base operably connected to the seat back. The seat base has a seat base frame that includes a torsion tube extending laterally between at least two side members. A height adjustment mechanism is disposed through at least one of the side members. A torsion spring extends within the torsion tube and is in contact with at least two side members. A torsion spring bushing is positioned around the torsion spring and extends into the torsion tube. The torsion spring bushing defines a brush configured to contact the torsion tube and a retaining ring positioned around the torsion tube. The retaining ring is in contact with at least one side member.

20 Claims, 9 Drawing Sheets

(56) References Cited

U.S. PATENT DOCUMENTS

| | | |
|---|---|---|
| 3,403,938 A | 10/1968 | Cramer et al. |
| 3,481,327 A | 12/1969 | Drennen |
| 3,511,534 A * | 5/1970 | Turner .................. B60N 2/235 297/366 |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,669,492 A | 6/1972 | Peterson |
| 3,779,577 A | 12/1973 | Wilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A | 6/1982 | Akiyama et al. |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Wahlmann et al. |
| 4,522,445 A | 6/1985 | Göldner et al. |
| 4,541,669 A | 9/1985 | Goldner |
| 4,575,151 A * | 3/1986 | Edstrom .................. A47C 3/026 297/302.6 |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | Isono et al. |
| 4,609,221 A | 9/1986 | Böttcher |
| 4,616,676 A | 10/1986 | Adams et al. |
| 4,616,874 A | 10/1986 | Pietsch et al. |
| 4,616,876 A * | 10/1986 | Suzuki .................. B60N 2/1615 248/397 |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Boisset |
| 4,693,513 A | 9/1987 | Heath |
| 4,707,027 A | 11/1987 | Horvath et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krügener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stöckl |
| 4,856,844 A | 8/1989 | Isono |
| 4,858,992 A | 8/1989 | LaSota |
| 4,861,104 A | 8/1989 | Malak |
| 4,884,843 A | 12/1989 | DeRees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,294 A | 5/1996 | Ligon, Sr. et al. |
| 5,544,942 A | 8/1996 | Vu Khac et al. |
| 5,547,214 A | 8/1996 | Zimmerman, II et al. |
| 5,560,681 A | 10/1996 | Dixon et al. |
| 5,570,716 A | 11/1996 | Kamen et al. |
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |
| 5,658,050 A | 8/1997 | Lorbiecki |
| 5,662,384 A | 9/1997 | O'Neill et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A | 6/1998 | Massara |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |
| 5,823,620 A | 10/1998 | Le Caz |
| 5,826,938 A | 10/1998 | Yanase et al. |
| 5,836,648 A | 11/1998 | Karschin et al. |
| 5,860,699 A | 1/1999 | Weeks |

(56) References Cited

U.S. PATENT DOCUMENTS

| | | |
|---|---|---|
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Crimmins et al. |
| 5,902,014 A | 5/1999 | Dinkel et al. |
| 5,906,586 A | 5/1999 | Graham |
| 5,913,568 A | 6/1999 | Brightbill et al. |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 6,019,387 A | 2/2000 | Jost |
| 6,024,378 A | 2/2000 | Fu |
| 6,024,406 A | 2/2000 | Charras et al. |
| 6,030,040 A | 2/2000 | Schmid et al. |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,781 A | 6/2000 | Tilley |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Wu et al. |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 | 3/2001 | Masters et al. |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,234,518 B1 | 5/2001 | Ryl et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 | 11/2001 | Eklind |
| 6,341,797 B1 | 1/2002 | Seo |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | Mack |
| 6,419,317 B1 | 7/2002 | Westrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |
| 6,523,892 B1 | 2/2003 | Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Wohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,890,030 B2 | 5/2005 | Wilkerson et al. |
| 6,899,399 B2 | 5/2005 | Ali et al. |
| 6,908,151 B2 | 6/2005 | Meeker et al. |
| 6,912,748 B2 | 7/2005 | VanSickle |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,991,256 B2 | 1/2006 | Henderson et al. |
| 6,991,289 B2 | 1/2006 | House |
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |
| 7,059,678 B1 | 6/2006 | Taylor |
| 7,072,764 B2 | 7/2006 | Donath et al. |
| 7,093,898 B2 | 8/2006 | De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kämmerer et al. |

(56) References Cited

U.S. PATENT DOCUMENTS

| | | | |
|---|---|---|---|
| 7,229,118 B2 | 6/2007 | Saberan et al. |
| 7,229,129 B2 | 6/2007 | White et al. |
| 7,234,771 B2 | 6/2007 | Nakhla |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,314,250 B1* | 1/2008 | Eblenkamp ......... B60N 2/0232 297/362 |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Jane Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,011,728 B2 | 9/2011 | Kohl et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |
| 8,360,530 B2 | 1/2013 | Onoda et al. |
| 8,371,655 B2 | 2/2013 | Nonomiya |
| 8,388,061 B2 | 3/2013 | Saito et al. |

(56) References Cited

U.S. PATENT DOCUMENTS

| | | |
|---|---|---|
| 8,397,688 B2 | 3/2013 | Cunningham |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 | 7/2013 | Line et al. |
| 8,496,098 B1 | 7/2013 | Napau et al. |
| 8,511,748 B2 | 8/2013 | McLeod et al. |
| 8,516,842 B2 | 8/2013 | Petrovski |
| 8,534,760 B2 | 9/2013 | Kotz |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,678,500 B2 | 3/2014 | Lem et al. |
| 8,696,067 B2 | 4/2014 | Galbreath et al. |
| 8,727,374 B1 | 5/2014 | Line et al. |
| 8,752,894 B2 | 6/2014 | Trimbom et al. |
| 8,794,707 B2 | 8/2014 | Bocsanyi et al. |
| 8,807,594 B2 | 8/2014 | Mizobata |
| 8,827,371 B2 | 9/2014 | Bmcick et al. |
| 8,899,683 B2 | 12/2014 | Ito |
| 8,905,431 B1 | 12/2014 | Line et al. |
| 8,967,663 B2 | 3/2015 | Seki et al. |
| 8,979,204 B2 | 3/2015 | Awata et al. |
| 9,096,157 B2 | 8/2015 | Line et al. |
| 9,126,504 B2 | 9/2015 | Line et al. |
| 9,126,508 B2 | 9/2015 | Line et al. |
| 2001/0011812 A1 | 8/2001 | Seki et al. |
| 2002/0096915 A1 | 7/2002 | Haupt et al. |
| 2002/0113473 A1 | 8/2002 | Knaus |
| 2002/0145422 A1 | 10/2002 | Chamings et al. |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0213105 A1 | 11/2003 | Bednarski |
| 2004/0012237 A1 | 1/2004 | Horiki et al. |
| 2004/0051361 A1* | 3/2004 | Rausch ............... B60N 2/0705 297/341 |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0076816 A1* | 4/2006 | Fujita ............... B60N 2/22 297/362.12 |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0181131 A1* | 8/2006 | Kienke ............... B60N 2/2352 297/367 R |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0108826 A1* | 5/2007 | Kojima ............... B60N 2/1615 297/374 |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Wolas et al. |
| 2007/0241593 A1 | 10/2007 | Woerner |
| 2007/0296194 A1 | 12/2007 | Ridgway et al. |
| 2008/0036258 A1 | 2/2008 | Holdampf et al. |
| 2008/0067850 A1 | 3/2008 | Stenstrom et al. |
| 2008/0073961 A1* | 3/2008 | Wahls ............... B60N 2/236 297/367 R |
| 2008/0122241 A1 | 5/2008 | Blackmore et al. |
| 2008/0157577 A1 | 7/2008 | Lindsay |
| 2008/0174159 A1 | 7/2008 | Kojima et al. |
| 2008/0203797 A1* | 8/2008 | Roslund ............ A47C 1/03238 297/344.19 |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Agostini et al. |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurski et al. |
| 2010/0109401 A1 | 5/2010 | Booth et al. |
| 2010/0117414 A1 | 5/2010 | Hwang et al. |
| 2010/0127546 A1* | 5/2010 | Dziedzic ............ B60N 2/2356 297/367 R |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Bmcick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Bmcick et al. |
| 2011/0121629 A1* | 5/2011 | Roth ............... B60N 2/20 297/354.12 |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Thong et al. |
| 2011/0186560 A1 | 8/2011 | Kennedy et al. |
| 2011/0187174 A1 | 8/2011 | Tscherbner |
| 2011/0199200 A1 | 8/2011 | Lueke et al. |

(56) References Cited

U.S. PATENT DOCUMENTS

| | | |
|---|---|---|
| 2011/0215200 A1 | 9/2011 | Mejuhas |
| 2011/0215626 A1* | 9/2011 | Lehmann ............... B60N 2/20 297/354.12 |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1 | 10/2013 | Arant et al. |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0145485 A1* | 5/2014 | Couasnon ............ B60N 2/2358 297/378.12 |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300164 A1* | 10/2014 | Oda .................. A47C 1/03266 297/354.1 |
| 2014/0300167 A1 | 10/2014 | Datta |
| 2014/0361571 A1 | 12/2014 | Line et al. |
| 2014/0375100 A1 | 12/2014 | Reese |
| 2015/0069806 A1* | 3/2015 | Lutzka ................ B60N 2/3065 297/340 |
| 2015/0108816 A1 | 4/2015 | Dry et al. |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0283970 A1 | 10/2015 | Line et al. |
| 2015/0336477 A1* | 11/2015 | Matsui .................. B60N 2/682 297/344.15 |
| 2016/0001680 A1* | 1/2016 | Thiel ..................... B60N 2/20 297/366 |
| 2016/0023576 A1* | 1/2016 | Pino ..................... B60N 2/366 297/378.12 |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 0174884 B1 | 9/1987 |
| EP | 0386890 A1 | 9/1990 |
| EP | 0518830 A1 | 12/1992 |
| EP | 0627339 A1 | 12/1994 |
| EP | 0670240 A1 | 9/1995 |
| EP | 0754590 A2 | 1/1997 |
| EP | 0594526 B1 | 9/1997 |
| EP | 0921033 A2 | 6/1999 |
| EP | 1077154 A2 | 2/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 B1 | 10/2005 |
| EP | 1084901 B1 | 6/2006 |
| EP | 1674333 A1 | 6/2006 |
| EP | 1674333 B1 | 8/2007 |
| EP | 1839932 A2 | 10/2007 |
| EP | 1950085 A3 | 12/2008 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |

(56) References Cited

FOREIGN PATENT DOCUMENTS

| | | |
|---|---|---|
| GB | 2011254 A | 7/1979 |
| GB | 2403139 A | 12/2004 |
| GB | 2430420 B | 3/2009 |
| JP | 61036029 A | 2/1986 |
| JP | 05115331 A | 5/1993 |
| JP | 2008189176 A | 8/2008 |
| JP | 2009096422 A | 5/2009 |
| JP | 201178557 A | 4/2011 |
| JP | 2011098588 A | 5/2011 |
| JP | 2011251573 A | 12/2011 |
| KR | 20050110301 A | 11/2005 |
| KR | 20080066428 A | 7/2008 |
| KR | 20100019390 A | 2/2010 |
| KR | 1020110051692 A | 5/2011 |
| KR | 101180702 B1 | 9/2012 |
| NO | 2011068684 A1 | 6/2011 |
| WO | WO9511818 A1 | 5/1995 |
| WO | 9534449 A1 | 12/1995 |
| WO | 9815435 A1 | 4/1998 |
| WO | 9831992 A1 | 7/1998 |
| WO | 9919708 | 4/1999 |
| WO | WO9958022 A1 | 11/1999 |
| WO | 0021797 A1 | 4/2000 |
| WO | 0144026 A1 | 6/2001 |
| WO | WO2006131189 A1 | 12/2006 |
| WO | 20070098893 A2 | 1/2007 |
| WO | WO2007028015 A2 | 3/2007 |
| WO | 2008019981 A1 | 2/2008 |
| WO | WO2008073285 A1 | 6/2008 |
| WO | 2010096307 A1 | 8/2010 |
| WO | WO2011021952 A1 | 2/2011 |
| WO | WO2012008904 A1 | 1/2012 |
| WO | 2012138699 A1 | 10/2012 |
| WO | 2013040085 A2 | 3/2013 |
| WO | 2013070905 A1 | 5/2013 |
| WO | 2013101644 A1 | 7/2013 |
| WO | 2014047417 A1 | 3/2014 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page) [Accessed from the internet Apr. 10, 2013].
Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).
Brose India Automotive Systems, "Adaptive Sensor Controlled Headrest," http://www.indiamart.com/broseindiaautomotivesystems/products.html, Oct. 9, 2012 (12 pages).
ecoustics.com, "Cineak Motorized Articulating Headrest Preview," http://www.ecoustics.com/ah/reviews/furniture/accessories/cineak-motorized-headrest, Oct. 9, 2012 (3 pages).
"Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.
"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.
"Imola Pro-fit", Cobra, (http://cobra.subesports.com/products/cat/seats/brand/Cobra/prodID/656), Date unknown, 2 pages.
Freedman Seating Company, "Go Seat," http://www.freedmanseating.com/images/uploads/files/GOSeat_Brochure_10-19.pdf, (date unknown), 2 pgs.
Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.
"Seat Comfort Systems", Installation Manual, KIT P/N: SCSOOOOOC3, http://www.techwebasto.com/accessories_main/seat_accessories/g_scs_vent_install.pdf, (date unknown), 7 pgs.
Car Reviews, "Audi A4 Saloon RS4", http://www.theaa.com/allaboutcars/cartestreports/2006037.html, Apr. 2006, 5 pgs.
Recaro Gmbh & Co. KG, "Seat Range", ID No. 7218054, Mar. 2010, 21 pgs.
Kelley Blue Book, "2011 Mercedes-Benz CL-Class", http://www.kbb.com/mercedes-benz/cl-class/2011-mercedes-benz-cl-class/, Feb. 28, 2013, 5 pgs.
Lexus, "The all-new Lexus 2013", lexus.com P2-332, Feb. 2012, 13 pgs.
Mercedes-Benz, "Interior comfort—spoilt for choice", http://www.zungfu.com/pc_E_saloon.comfort.1.shtml, Feb. 28, 2013, 3 pgs.
Rostra Precision Controls Inc., "Universal Lumbar Installation Instructions", http://www.rostra.com/manuals/form3132F.pdf, Nov. 2, 2007, 8 pgs.
"Seats", http://www.bavarianmw.com/guide-4400.html, www.bmwmanuals.org, 2012, 5 pgs.
Mercedes-Benz, "Seat belts and airbags", http://www.mbusa.com/vcm/MB/DigitalAssets/pdfmb/serviceandparts/seatbelts_airbags.pdf, Oct. 27, 2005, 11 pgs.
SAE International, "Capacitive Sensors Increase Safety, Comfort", http://sae.org/automag/technewsletter/071106Electronics/04.htm, Jun. 13, 2013, 3 pages.
General Motors LLC, "2013 Chevrolet Spark Owner Manual," copyright 2012, 356 pages.
Matthew W Ing, United States Patent and Trademark Office, Non Final Office Communication re U.S. Appl. No. 13/749,561, dated Oct. 16, 2015, 33 pages.
Richard A Lowry, United States Patent and Trademark Office, Non Final Office Communication re U.S. Appl. No. 13/748,847, dated Sep. 10, 2014, 14 pages.
David E Allred, United States Patent and Trademark Office, Non Final Office Communication re U.S. Appl. No. 13/748,857, dated Aug. 25, 2014, 13 pages.
Timothy J Brindley, United States Patent and Trademark Office, Final Office Communication re U.S. Appl. No. 13/749,568, dated Mar. 26, 2015, 9 pages.
Timothy J Brindley, United States Patent and Trademark Office, Non Final Office Communication re U.S. Appl. No. 13/749,568, dated Sep. 8, 2014, 9 pages.
Milton Nelson Jr., United States Patent and Trademark Office, Final Office Communication re U.S. Appl. No. 13/749,572, dated Mar. 3, 2015, 13 pages.
Milton Nelson Jr., United States Patent and Trademark Office, Non Final Office Communication re U.S. Appl. No. 13/749,572, dated Sep. 30, 2014, 20 pages.
Nicole T Verley, United States Patent and Trademark Office, Non Final Office Communication re U.S. Appl. No. 13/749,589, dated Oct. 4, 2013, 12 pages.
Timothy J Brindley, United States Patent and Trademark Office, Non Final Office Communication re U.S. Appl. No. 13/749,595, dated Aug. 28, 2014, 10 pages.
Timothy J Brindley, United States Patent and Trademark Office, Final Office Communication re U.S. Appl. No. 13/749,595, dated Jan. 12, 2015, 10 pages.
Timothy J Brindley, United States Patent and Trademark Office, Non Final Office Communication re U.S. Appl. No. 13/749,584, dated Sep. 15, 2014, 9 pages.
Yolanda G Giacoman, United States Patent and Trademark Office, Final Office Communication re U.S. Appl. No. 13/748,862, filed Dec. 30, 2015, 10 pages.
Yolanda G Giacoman, United States Patent and Trademark Office, Non Final Office Communication re U.S. Appl. No. 13/748,862, filed Aug. 13, 2015, 9 pages.
Yolanda G Giacoman, United States Patent and Trademark Office, Final Office Communication re U.S. Appl. No. 13/748,862, filed Mar. 10, 2015, 19 pages.
Yolanda G Giacoman, United States Patent and Trademark Office, Non Final Office Communication re U.S. Appl. No. 13/748,862, filed Sep. 25, 2014, 16 pages.

(56) References Cited

OTHER PUBLICATIONS

Milton Nelson Jr., United States Patent and Trademark Office, Non Final Office Communication re U.S. Appl. No. 13/749,602, filed Sep. 19, 2014, 9 pages.

Melissa Ann Black, United States Patent and Trademark Office, Non Final Office Communication re U.S. Appl. No. 13/914,666, dated Mar. 13, 2015, 6 pages.

Philip F Gabler, United States Patent and Trademark Office, Non Final Office Communication re U.S. Appl. No. 14/025,483, dated Dec. 17, 2014, 8 pages.

Philip F Gabler, United States Patent and Trademark Office, Final Office Communication re U.S. Appl. No. 14/025,483, dated Apr. 23, 2015, 10 pages.

Philip F Gabler, United States Patent and Trademark Office, Non Final Office Communication re U.S. Appl. No. 14/025,483, dated Aug. 18, 2015, 14 pages.

Philip F Gabler, United States Patent and Trademark Office, Final Office Communication re U.S. Appl. No. 14/025,483, dated Dec. 18, 2015, 14 pages.

Peter R Brown, United States Patent and Trademark Office, Final Office Communication re U.S. Appl. No. 14/104,780, dated Dec. 1, 2015, 5 pages.

Peter R Brown, United States Patent and Trademark Office, Non Final Office Communication re U.S. Appl. No. 14/104,780, dated Jun. 29, 2015, 9 pages.

Nicole T Verley, United States Patent and Trademark Office, Advisory Action for U.S. Appl. No. 14/056,005, dated Sep. 30, 2015, 3 pages.

Nicole T Verley, United States Patent and Trademark Office, Final Office Communication re U.S. Appl. No. 14/056,005, dated Jun. 10, 2015, 8 pages.

Nicole T Verley, United States Patent and Trademark Office, Non Final Office Communication re U.S. Appl. No. 14/056,005, dated Mar. 2, 2015, 8 pages.

Peter R Brown, United States Patent and Trademark Office, Non Final Office Communication re U.S. Appl. No. 14/056,000, dated Mar. 4, 2015, 7 pages.

Peter R Brown, United States Patent and Trademark Office, Non Final Office Communication re U.S. Appl. No. 14/056,000, dated Oct. 1, 2014, 8 pages Philip F Gabler, United States Patent and Trademark Office, Final Office Communication re U.S. Appl. No. 14/076,893, dated Sep. 29, 2015, 13 pages.

Philip F Gabler, United States Patent and Trademark Office, Non Final Office Communication re U.S. Appl. No. 14/076,893, dated Apr. 21, 2015, 12 pages.

David E Allred, United States Patent and Trademark Office, Non Final Office Communication re U.S. Appl. No. 14/063,647, dated Aug. 18, 2015, 19 pages.

Matthew W Ing, United States Patent and Trademark Office, Non Final Office Communication re U.S. Appl. No. 14/609,092, Oct. 19, 2015, 11 pages.

Alexander Scott Harrison, United States Patent and Trademark Office, Final Office Communication re U.S. Appl. No. 14/243,027, dated Jan. 20, 2016, 17 pages.

Alexander Scott Harrison, United States Patent and Trademark Office, Non Final Office Communication re U.S. Appl. No. 14/243,027, dated Aug. 13, 2015, 15 pages.

Ryan D Kwiecinski, United States Patent and Trademark Office, Non Final Office Communication re U.S. Appl. No. 14/230,961, dated Dec. 24, 2015, 12 pages.

Philip F Gabler, United States Patent and Trademark Office, Final Office Communication re U.S. Appl. No. 14/257,655, dated Dec. 18, 2015, 10 pages.

Philip F Gabler, United States Patent and Trademark Office, Non Final Office Communication re U.S. Appl. No. 14/257,655, dated Aug. 20, 2015, 10 pages.

Syed A Islam, United States Patent and Trademark Office, Final Office Communication re U.S. Appl. No. 14/275,368, dated Nov. 13, 2015, 13 pages.

Syed A Islam, United States Patent and Trademark Office, Non Final Office Communication re U.S. Appl. No. 14/275,368, dated May 6, 2015, 10 pages.

Laurie K Cranmer, United States Patent and Trademark Office, Non Final Office Communication re U.S. Appl. No. 14/505,675, dated Aug. 31, 2015, 7 pages.

Rodney Barnett White, United States Patent and Trademark Office, Non Final Office Communication re U.S. Appl. No. 14/600,166, dated Nov. 2, 2015, 7 pages.

Rodney Barnett White, United States Patent and Trademark Office, Final Office Communication re U.S. Appl. No. 14/534,296, dated Dec. 11, 2105, 14 pages.

Rodney Barnett White, United States Patent and Trademark Office, Non Final Office Communication re U.S. Appl. No. 14/534,296, dated Aug. 26, 2015, 13 pages.

Sanjeev Malhotra, United States Patent and Trademark Office, Non Final Office Communication re U.S. Appl. No. 14/534,285, dated Sep. 23, 2015, 14 pages.

Nicole T Verley, United States Patent and Trademark Office, Non Final Office Communication re U.S. Appl. No. 14/635,025, dated Dec. 4, 2015, 8 pages.

* cited by examiner

US 9,802,512 B1

TORSION SPRING BUSHING

FIELD OF THE INVENTION

The present disclosure generally relates to a vehicle seating assembly, and more particularly, a torsion tube assembly disposed within a seat bottom of the seating assembly.

BACKGROUND OF THE INVENTION

Vehicle seating assemblies may include a torsion spring disposed within a torsion tube to regulate the force for adjusting the height of the seating assembly.

SUMMARY OF THE INVENTION

According to one aspect of the present disclosure, a vehicle seating assembly is provided that includes a seat back and a seat base operably connected to the seat back. The seat base has a seat base frame that includes a torsion tube extending laterally between at least two side members. A height adjustment mechanism is disposed through at least one of the side members. A torsion spring extends within the torsion tube and is in contact with at least two side members. A torsion spring bushing is positioned around the torsion spring and extends into the torsion tube. The torsion spring bushing defines a brush configured to contact the torsion tube and a retaining ring positioned around the torsion tube. The retaining ring is in contact with at least one side member.

According to another aspect of the present disclosure, a vehicle seat base is provided that includes a seat base frame having a torsion tube extending laterally between at least two side members. A torsion spring extends within the torsion tube and is in contact with both side members. A torsion spring bushing is positioned around the torsion spring and extends into the torsion tube. The bushing defines a plurality of brushes protruding from the bushing and configured to engage the torsion tube.

According to yet another aspect of the present disclosure, a vehicle seat base is provided that includes a seat base frame having a torsion tube extending laterally between at least two side members, a torsion spring extending within the torsion tube and a torsion spring bushing positioned around the torsion spring and extending into the torsion tube. The bushing defines a hinge and a fastener disposed on opposite sides of the bushing These and other aspects, objects, and features of the present disclosure will be understood and appreciated by those skilled in the art upon studying the following specification, claims, and appended drawings.

DETAILED DESCRIPTION

Figure 1:
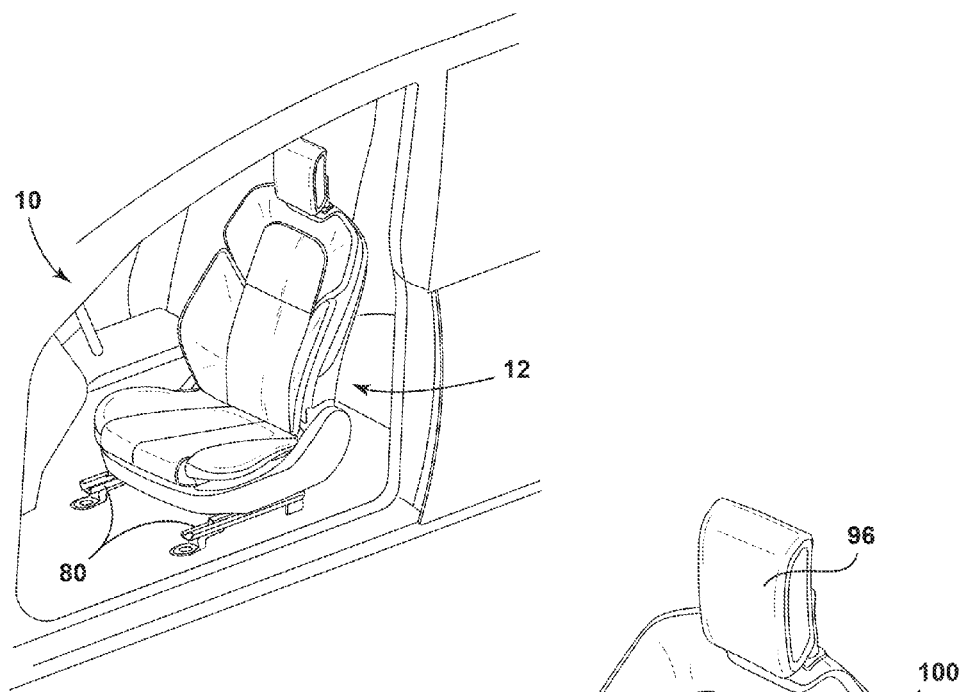
FIG. 1 is a top perspective view of a vehicle seat disposed inside a vehicle.

Reference will now be made in detail to the present embodiments, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivatives thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring now to FIGS. 1-6B, reference numeral 10 generally designates a vehicle in which a vehicle seating assembly 12 is positioned. The vehicle seating assembly 12 includes a seat back 14 and a seat base 18. The seat base 18 is operably connected to the seat back 14. The seat base 18 includes a seat base frame 28 having a torsion tube 32 extending laterally between at least two side members 36. A height adjustment mechanism 40 is disposed through at least one of the side members 36. A torsion spring 44 extends within the torsion tube 32 and is in contact with both side members 36. A torsion spring bushing 48 positioned around the torsion spring 44 and extending into the torsion tube 32. The torsion spring bushing 48 defines a brush 52 configured to contact the torsion tube 32. A retaining ring 56 is positioned around the torsion tube 32. The retaining ring 56 is in contact with at least one side member 36.

Figure 2:
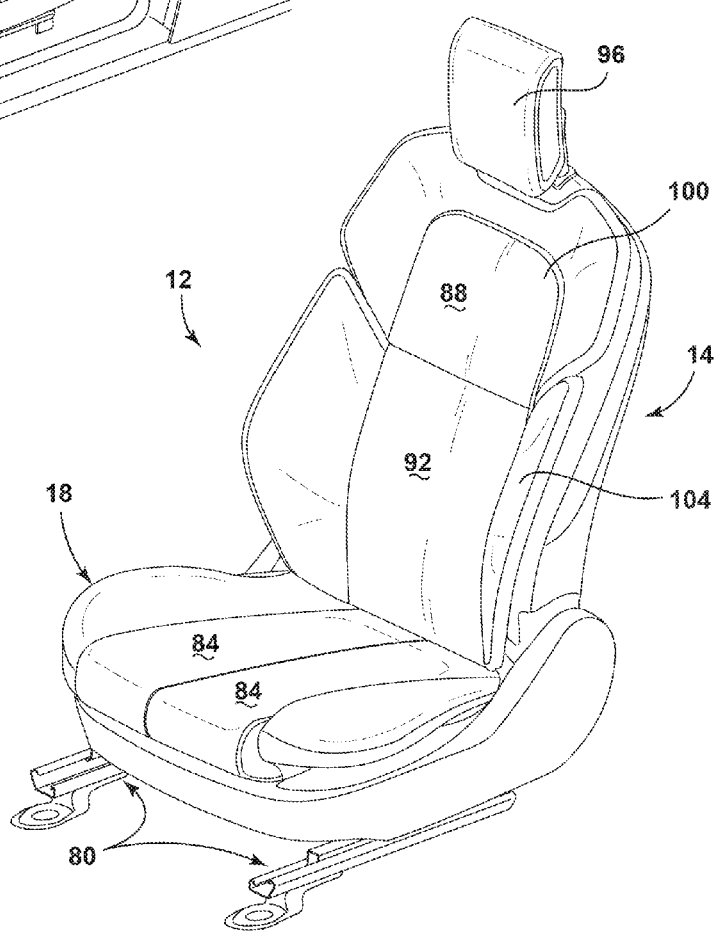
FIG. 2 is a top perspective view of the vehicle seat of FIG. 1.

Referring now to FIGS. 1 and 2, the illustrated vehicle seating assembly 12 is configured for use in a vehicle of any type, including, without limitation, cars, vans, trucks, buses, etc. The vehicle seating assembly 12 is suspended on rails 80 that allow movement of the vehicle seating assembly 12 in fore and aft directions within the vehicle 10. In addition, the vehicle seating assembly 12 may include a variety of comfort controls, including, for example, thigh support using independent thigh supports 84, lumbar support, and upper thoracic support. The seat back 14 includes both an upper seat back 88 and a lower seat back 92. The vehicle seating assembly 12 includes a head restraint 96 that is disposed on the upper seat back 88. The head restraint 96 is moveable between forward and rearward positions to accommodate various sized heads of passengers, as well as different heights of passengers. The vehicle seating assembly 12 also includes controls specifically configured to adjust an upper thoracic portion 100 of the upper seat back 88 or a lower thoracic portion 104 of the lower seat back 92.

Figure 3A:
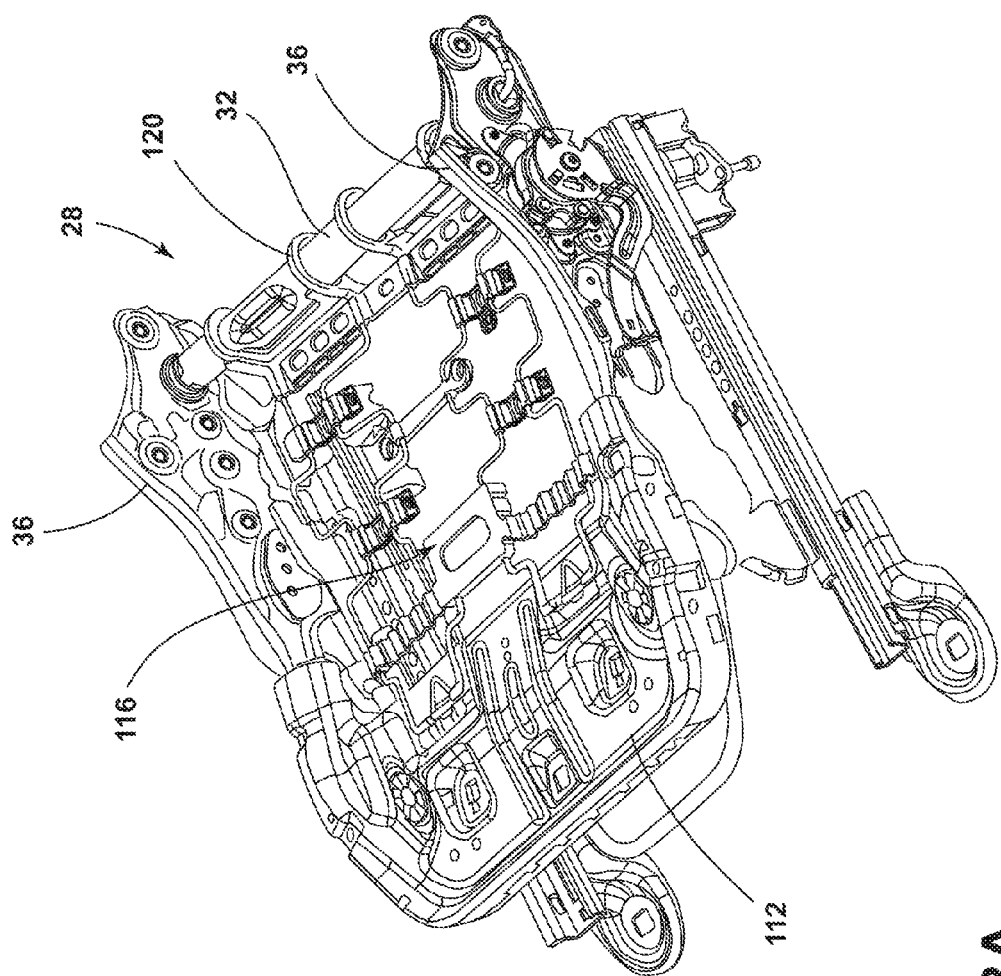
FIG. 3A is a top perspective view of a seat bottom frame of the vehicle seat with a cover and padding removed.
Figure 3B:
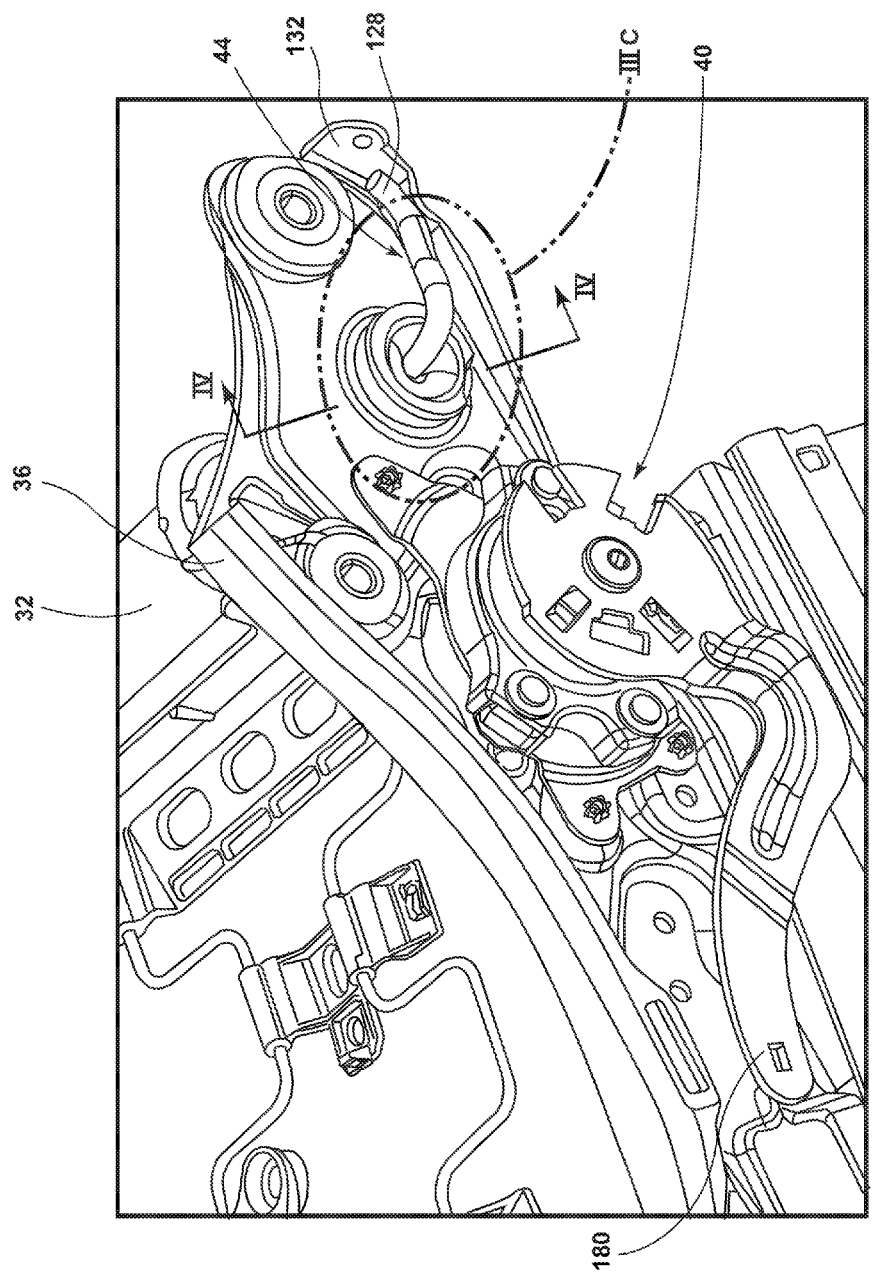
FIG. 3B is an enhanced view of FIG. 3A, according to the present disclosure.

Referring now to FIG. 3A, disposed within the seat base 18 (FIG. 2) is the seat base frame 28. As explained above, the seat base frame 28 includes the torsion tube 32 which extends between the side members 36. The side members 36 are operably coupled to a seat pan 112 which aids in providing support to the thigh supports 84 (FIG. 2). In some examples, the seat pan 112 may contain independently actuatable portions such that the thigh supports 84 may be moved independently of one another. Positioned in the center of the seat base frame 28 is a suspension member 116 configured to provide resiliency and support to cushion assemblies of the seat base 18. The suspension member 116 may include a plurality of hooks 120 configured to wrap over the torsion tube 32 to support the suspension member 116. Additionally, at least one of the side members 36 includes the height adjustment mechanism 40 (FIG. 3B). The height adjustment mechanism 40 may be used to adjust the height of the seat base 18 relative to a floor of the vehicle 10, as explained in greater detail below.

Figure 3C:
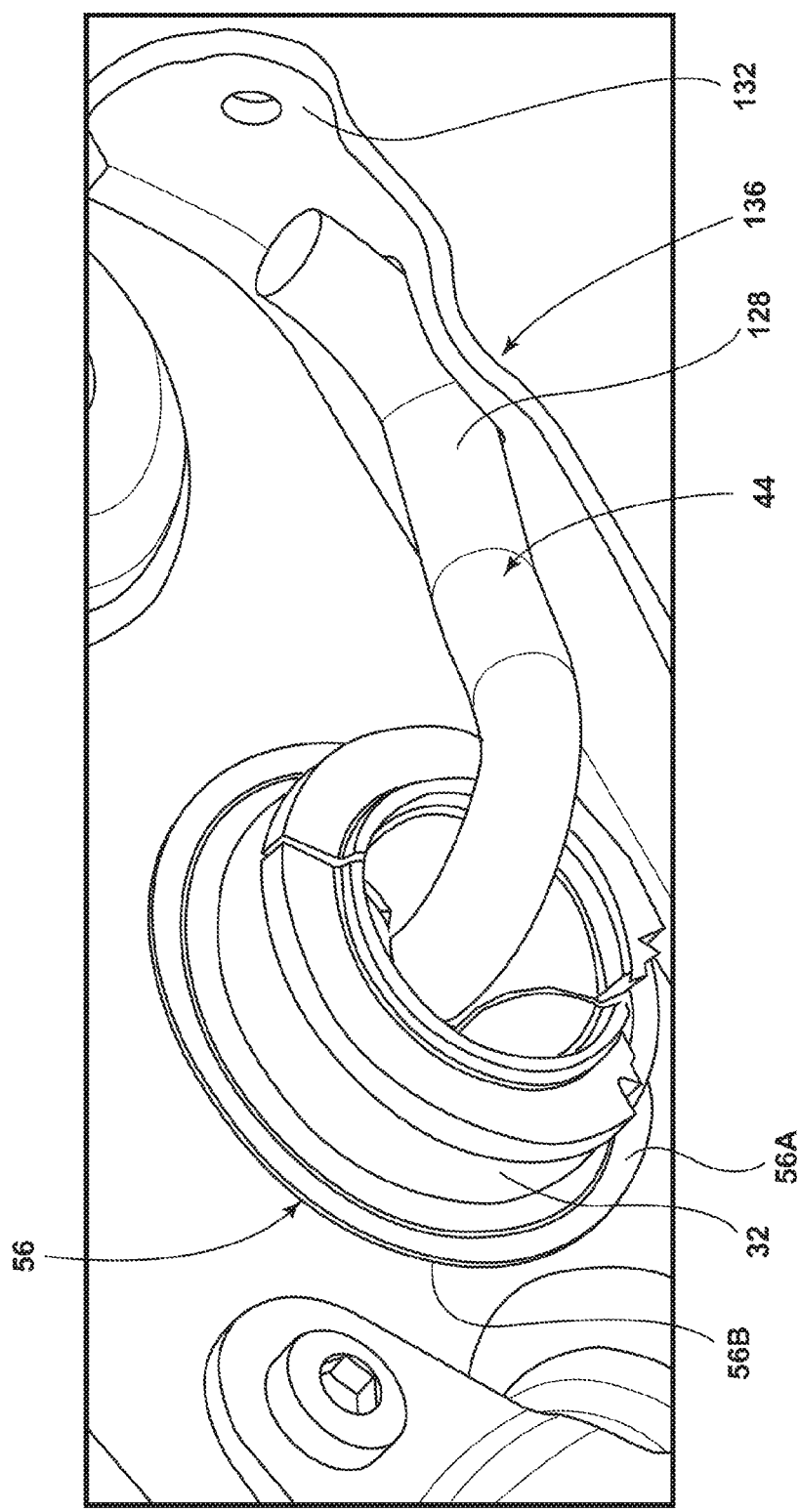
FIG. 3C is an enhanced view taken at IIIC of FIG. 3B, according to the present disclosure.
Figure 4:
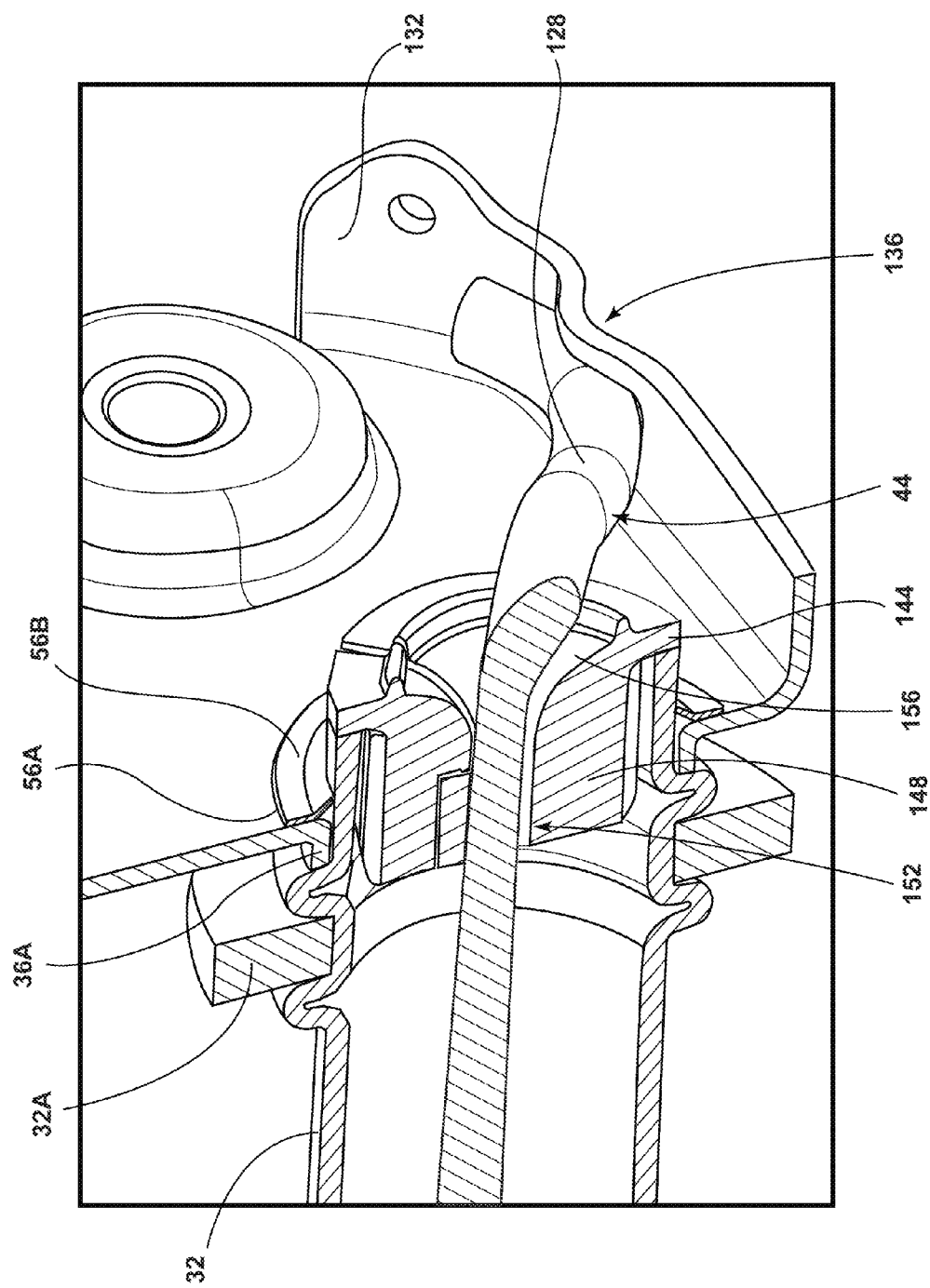
FIG. 4 is a cross-sectional view taken along line IV of FIG. 3B, according to the present disclosure.
Figure 5A:
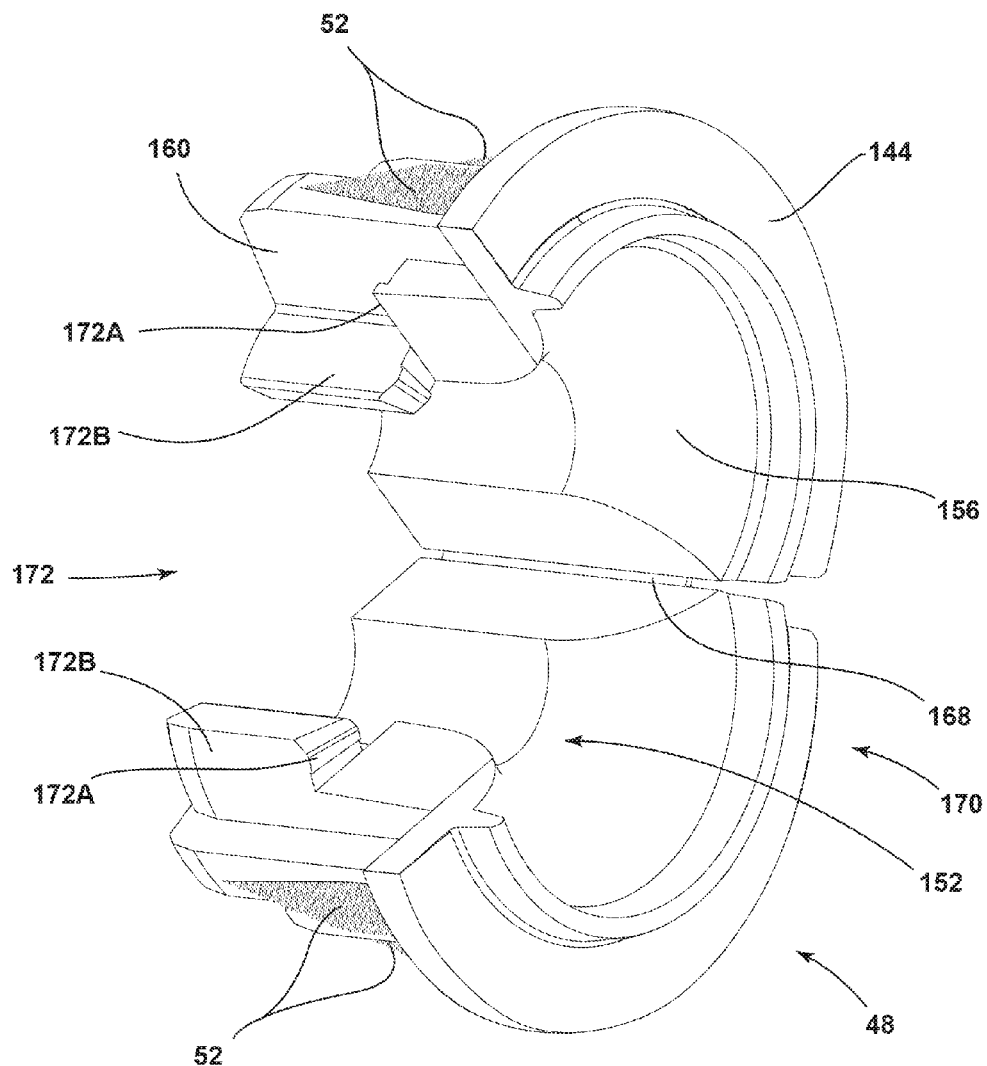
FIG. 5A is a front perspective view of a torsion spring bushing in an open configuration, according to the present disclosure.
Figure 5B:
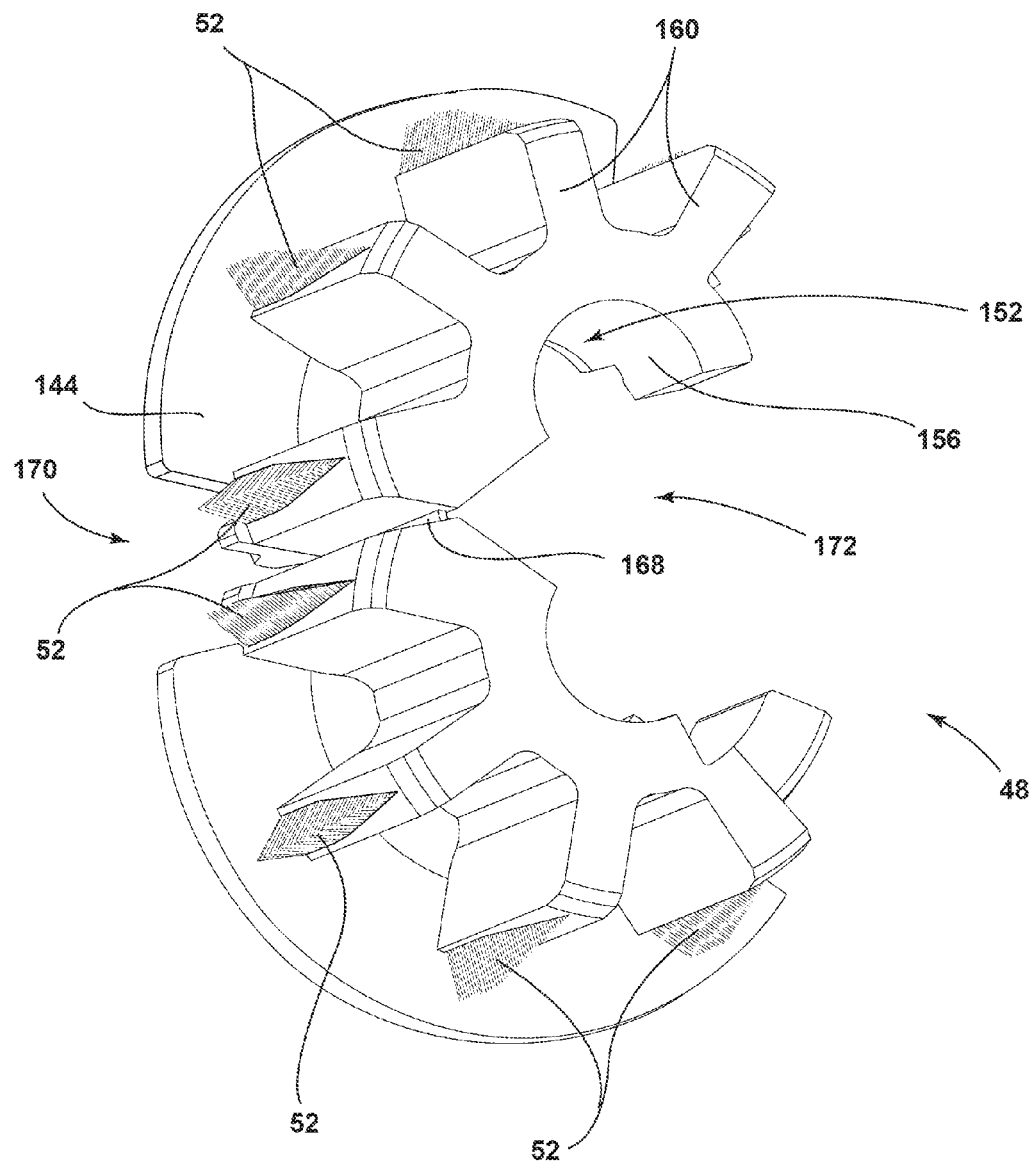
FIG. 5B is a back perspective view of a torsion spring bushing in an open configuration, according to the present disclosure.
Figure 5C:
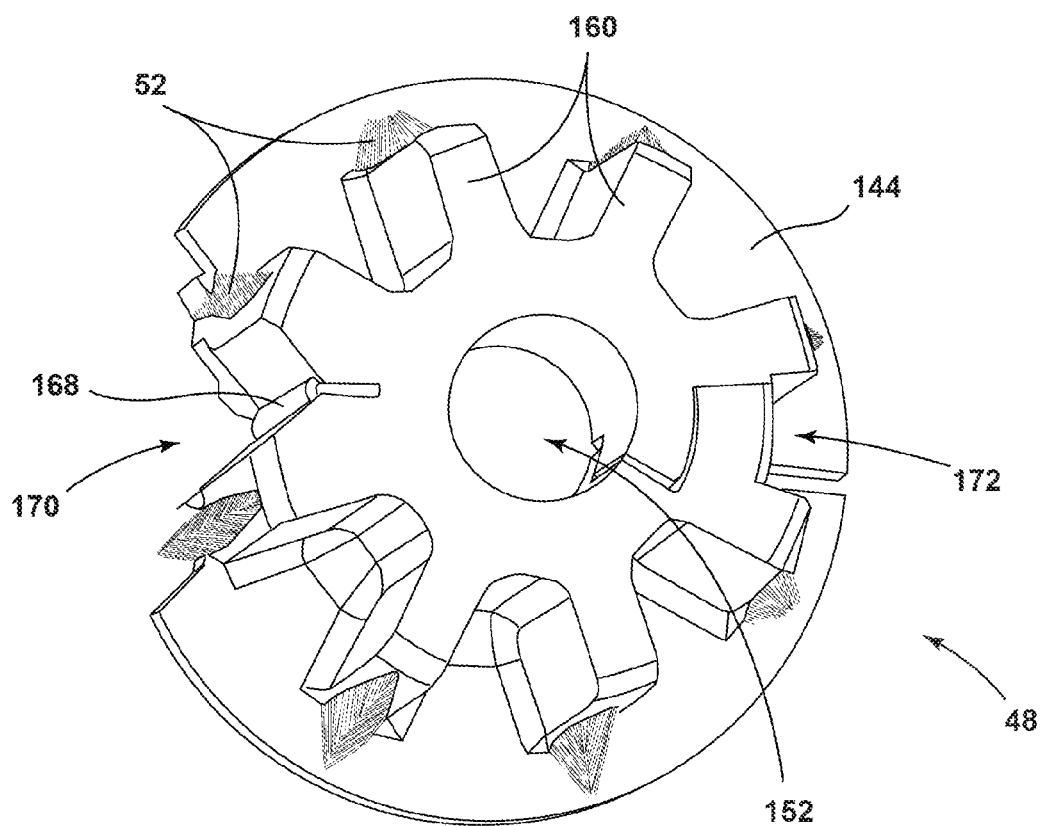
FIG. 5C is a back perspective view of a torsion spring bushing in a closed configuration, according to the present disclosure.

Referring now to FIGS. 3B, 3C and 4, positioned vehicle rearward of the height adjustment mechanism 40 is the torsion tube 32. The torsion tube 32 extends between the two side members 36, and in the depicted example, partially extends through the side members 36. The side members 36 define a torsion flange 36A configured to contact a tube ridge 32A. The contact of the tube ridge 32A with the side flange 36A may be used to ensure the torsion tube 32 extends a proper distance through the side members 36. The torsion tube 32 may define a pair of torsion ridges 32A configured to lock a torsion arm 124 (FIG. 6B) in place. Positioned around the torsion tube 32 and in contact with the side member 36 is the retaining ring 56. The retaining ring 56 is positioned on an opposite side of the side member 36 than the tube ridge 32A and is proximate the side flange 36A. The retaining ring 56 is configured to grip the torsion tube 32 such that motion of the torsion tube 32 that would tend to remove it from the side member 36 is resisted and the torsion tube 32 is retained in the side member 36. The retaining ring 56 includes a base portion 56A in contact with the side member 36 and an angled portion 56B in contact with the torsion tube 32. In the depicted example, the angled portion 56B of the retaining ring 56 is composed of multiple parts, but may instead be a continuous structure.

Extending through the torsion tube 32 is the torsion spring 44. The torsion spring 44 extends substantially coaxially with the torsion tube 32 and includes bent portions 128 extending substantially perpendicular to the axis of the torsion tube 32. The torsion spring 44 may store strain energy by twisting to resist motion of the seat base 18 (FIG. 2) up and down relative to the floor of the vehicle 10 (FIG. 1). The bent portions 128 bend in a vehicle rearward direction and engage side flanges 132 defined by each of the side members 36. The side flanges 132 each define a securement feature 136 configured to hold the bent portions 128 in place.

Referring now to FIGS. 4, and 5A-C, positioned around the torsion spring 44 is the torsion spring bushing 48. The torsion spring bushing 48 may be composed of a polymeric material, a metal, or a composite thereof. The torsion spring bushing 48 defines a bushing lip 144 and a bushing body 148. The bushing body 148 may have a length of between about 7.5 mm and about 30.0 mm. The bushing body 148 may be tapered on an end configured to be inserted into the torsion tube 32. The bushing lip 144 may be a continuous structure, as depicted, or may be semi-continuous around the bushing 48 (i.e. multiple discrete portions). The bushing lip 144 may have a thickness of between about 1.0 mm and about 5.0 mm. The bushing lip 144 may have a diameter, or longest length, of between about 15 mm and about 60 mm. In a specific example, the diameter of the bushing lip 144 may be about 30 mm. The bushing body 148 is sized to be inserted into the torsion tube 32 such that an end of the torsion tube 32 is in contact with the bushing lip 144. The torsion spring bushing 48 defines an annulus 152 through which the torsion spring 44 extends. Positioned proximate the annulus 152 is a curved conical surface 156. The curved conical surface 156 opens with increasing distance from the annulus 152. Defined around the bushing body 148 is a plurality of protrusions 160. The protrusions 160 are tall, thin, structures which extend outwardly toward the torsion tube 32. The protrusions 160 may extend radially outward as far as the bushing lip 144, or may be smaller. In the depicted example, the bushing body 148 defines eight protrusions 160, but the body 148 may define between 2 and 16 protrusions 160. The bushing body 148, including the protrusions 160, may have a diameter of between about 10 mm and about 40 mm.

Positioned around the bushing body 148 is a plurality of brushes 52. The brushes 52 are positioned on top of the protrusions 160. The brushes 52 may extend the length of the bushing body 148 and protrusions 160, only a portion of the length or may have an intermittent spacing or placement along the length of the body 148. The brushes 52 may have a length along the protrusions of between about 6.0 mm and about 20 mm. The brushes 52 may have a height of between about 1.0 mm and about 4.0 mm. Each of the brushes 52 include a plurality of fibers extending radially outward from the protrusion 160. The fibers of the brushes 52 may be integrally defined by the protrusions 160 or may be applied thereto. The fibers may be composed of the same material as the bushing 48, or may be a different material. For example, the fibers may be composed of a polymeric material, a natural material, or composite thereof. The brushes 52 may be flexible and capable of being pressed against the bushing body 148 and an inside surface of the torsion tube 32. The brushes 52 may be equally spaced around the bushing body 148 or may be positioned in another pattern or irregular spacing. In examples where the bushing lip 144 is a discontinuous structure, the brushes 52 may be positioned between the brushing lips 144. The brushes 52 may taper in width along the bushing body 148 (i.e. have more or less fibers or have a less or more dense spacing).

The brushes 52 are configured to provide an interference fit between the torsion spring bushing 48 and the torsion tube 32. The flexibility of the brushes 52 allow the brushes 52 to fill a space formed between the bushing body 148 and an inner surface of the torsion tube 32. The brushes 52 are configured to create friction between the torsion tube 32 and the torsion spring bushing 48 such that lateral motion of the bushing 48 out of the tube 32 is resisted. Additionally, the interference fit between the torsion spring bushing 48 and the torsion tube 32 resists rotational movement of the bushing 48 within the torsion tube 32. In some examples, the inner surface of the torsion tube 32 may be roughened. In such examples, the roughened inner surface of the torsion tube 32 may generate a greater friction between the torsion tube 32 and the brushes 52 of the torsion spring bushing 48 thereby generating a stronger interference fit.

The torsion spring bushing 48 is configured to be operated between substantially open (FIGS. 5A and 5B) and substantially closed (FIG. 5C) configurations. The torsion spring bushing 48 includes a hinge 168 which allows the bushing 48 to rotate between the open and closed positions. In various examples, the hinge 168 may be a living hinge. The hinge 168 is positioned between two of the protrusions 160. Disposed around the hinge 168 is an alignment feature 170. In other examples, the alignment feature 170 may be formed anywhere around the torsion spring bushing 48. The alignment feature 170 may be formed in the bushing lip 144 as a general V-shaped opening. The torsion tube 32 may include one or more indicia (e.g., engraving and/or markings) which may be aligned with the alignment feature 170. The V-shaped opening of the alignment feature 170 may have an angular extent greater than about 20°, 30°, 40°, 50°, 60°, 70°, 80°, 90°, or 100°. In a specific example, the indicia and the alignment feature 170 may cooperate to define a general "arrow" shape. Such use of the indicia and the alignment feature 170 may allow the torsion spring bushing 48 to be quickly, and accurately, placed during assembly. In the depicted example, disposed on an opposite side of the torsion spring bushing 48 is a bushing fastener 172. The bushing fastener 172 includes opposing ridges 172A on opposing flanges 172B. The opposing ridges 172A are configured to snap together as the torsion spring bushing 48 is rotated to the substantially closed position around the torsion spring 44. It will be understood that in alternate examples, the torsion spring bushing 48 may not include the hinge 168, but rather include a similar bushing fastener 172 where the hinge 168 is depicted. In such an example, the torsion spring bushing 48 may be in two pieces until assembled (e.g., clicked together) around the torsion spring 44.

Figure 6A:
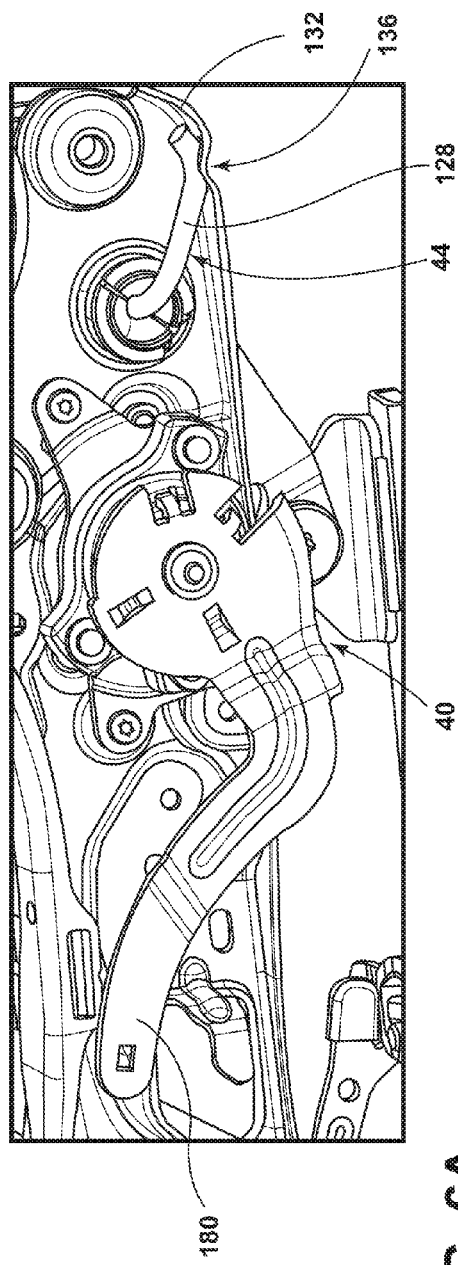
FIG. 6A depicts a side view of the seat bottom frame of FIG. 3A, according to the present disclosure.
Figure 6B:
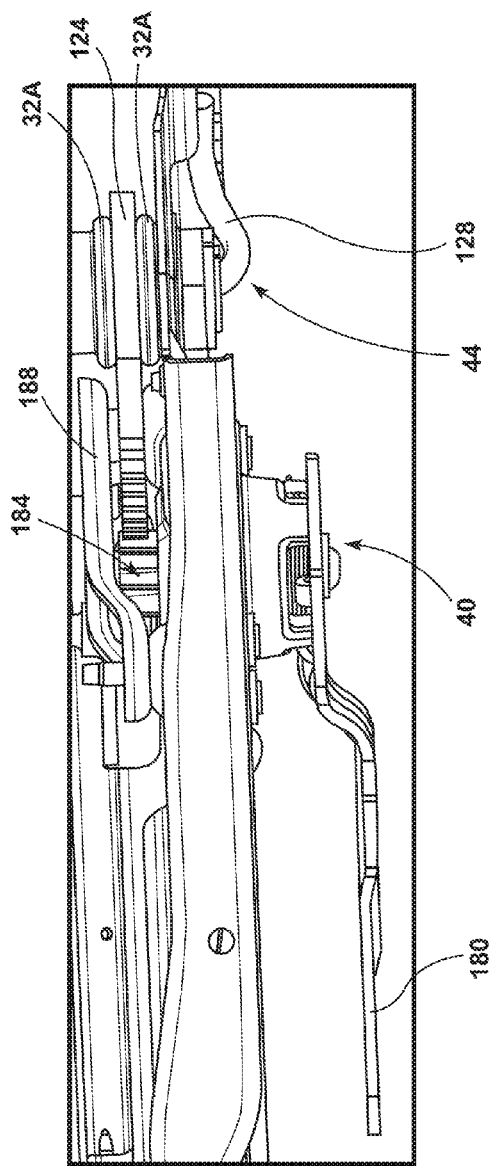
FIG. 6B depicts a top view of the seat bottom frame of FIG. 3A, according to the present disclosure.

Referring now to FIGS. 6A and 6B, the height adjustment mechanism 40 includes a handle 180 configured to rotate a gear 184 in contact with the torsion arm 124. The torsion arm 124 defines a plurality of teeth 188 configured to engage with the gear 184 such that rotation of the gear 184 (e.g., through motion of the handle 180) causes the torsion arm 124 to move along the gear 184. Movement of the torsion arm 124 causes the height of the seat base 18 (FIG. 2) to increase or decrease. As explained above, the torsion spring 44 may store strain energy to regulate the force needed for upward or downward motion of the seat base 18.

Various advantages may be gained through the use of the present disclosure. For example, use of the brushes 52 may prevent the force needed to increase the height of the seat base 18 from increasing over time. In traditional systems, bushings in torsion tubes may undergo rotational and lateral movement out of the tube, thereby contacting the torsion spring. As the bushing moves out of the torsion tube, increasing contact with the torsion spring may increase the force necessary to adjust the height of the seat. However, use of the brushes 52 may create an interference fit between the torsion spring bushing 48 and the torsion tube 32 such that the bushing 48 is resisted from negatively impacting the torsion spring 44. Additionally, use of the bushing fastener 172 and/or the hinge 168 may allow for quick and easy assembly of the bushing 48 around the torsion spring 44. Further, the alignment feature 170 may allow fast and accurate placement of the bushing 48 in the torsion tube 32.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a seat back; and
   a seat base operably connected to the seat back, the seat base having a seat base frame comprising:
      a torsion tube extending laterally between at least two side members;
      a height adjustment mechanism disposed through at least one of the side members;
      a torsion spring extending within the torsion tube and in contact with at least two side members;
      a torsion spring bushing positioned around the torsion spring and extending into the torsion tube, the torsion spring bushing comprising a brush configured to contact the torsion tube; and
      a retaining ring positioned around the torsion tube, the retaining ring in contact with at least one side member.

2. The vehicle seating assembly of claim 1, wherein the torsion spring bushing comprises a polymeric material.

3. The vehicle seating assembly of claim 1, wherein the retaining ring defines an angled portion.

4. The vehicle seating assembly of claim 1, wherein the torsion spring bushing is configured to center the torsion spring within the torsion tube.

5. The vehicle seating assembly of claim 1, wherein the torsion spring bushing defines a plurality of brushes.

6. The vehicle seating assembly of claim 5, wherein the plurality of brushes are configured to resist lateral and rotational movement of the torsion spring bushing within the torsion tube.

7. A vehicle seat base comprising:
   a seat base frame having a torsion tube extending laterally between at least two side members;
   a torsion spring extending within the torsion tube and in contact with both side members; and
   a torsion spring bushing positioned around the torsion spring and extending into the torsion tube, the torsion spring bushing comprising a plurality of protruding brushes configured to engage the torsion tube.

8. The vehicle seat base of claim 7, wherein the bushing defines an annulus around which a plurality of protrusions is defined.

9. The vehicle seat base of claim 8, wherein the plurality of brushes are positioned on the plurality of protrusions.

10. The vehicle seat base of claim 7, wherein the plurality of brushes are equally spaced on the torsion spring bushing.

11. The vehicle seat base of claim 7, wherein the plurality of brushes extend on the torsion spring bushing laterally relative to the torsion tube.

12. The vehicle seat base of claim 7, wherein each of the plurality of brushes comprise a plurality of fibers.

13. The vehicle seat base of claim 12, wherein the plurality of fibers comprise a polymeric material.

14. A vehicle seat base comprising:
   a seat base frame having a torsion tube extending laterally between at least two side members;

a torsion spring extending within the torsion tube; and a torsion spring bushing positioned around the torsion spring and extending into the torsion tube, the torsion spring bushing comprising a hinge and a fastener disposed on opposite sides of the torsion spring bushing.

15. The vehicle seat base of claim 14, wherein the hinge of the torsion spring bushing is configured to allow the bushing to open and close.

16. The vehicle seat base of claim 14, wherein the hinge of the bushing is a living hinge.

17. The vehicle seat base of claim 14, further comprising:

an alignment feature defined by the torsion spring bushing, wherein the hinge is positioned within the alignment feature.

18. The vehicle seat base of claim 14, wherein the alignment feature is generally V-shaped.

19. The vehicle seat base of claim 18, wherein the fastener a snap feature.

20. The vehicle seat base of claim 14, wherein the bushing defines an annulus having a curved conical shape.

* * * * *